United States Patent
Kim et al.

(10) Patent No.: US 9,515,871 B2
(45) Date of Patent: Dec. 6, 2016

(54) METHOD AND APPARATUS FOR PROTECTION SWITCHING

(71) Applicant: Electronics and Telecommunications Research Institute, Daejeon-si (KR)

(72) Inventors: Dae-Ub Kim, Daejeon-si (KR); Tae-Sik Cheung, Daejeon-si (KR); Jeong-Dong Ryoo, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 219 days.

(21) Appl. No.: 14/013,617

(22) Filed: Aug. 29, 2013

(65) Prior Publication Data

US 2014/0064064 A1 Mar. 6, 2014

(30) Foreign Application Priority Data

Sep. 6, 2012 (KR) ........................ 10-2012-0098904

(51) Int. Cl.
*H04L 12/24* (2006.01)
*H04L 12/703* (2013.01)

(52) U.S. Cl.
CPC ........... *H04L 41/0659* (2013.01); *H04L 45/28* (2013.01)

(58) Field of Classification Search
CPC .. H04L 45/28; H04L 41/0654; H04J 2203/006
See application file for complete search history.

(56) References Cited

U.S. PATENT DOCUMENTS

| 2010/0135291 | A1* | 6/2010 | Martin ................ H04L 45/00 370/389 |
| 2012/0026867 | A1* | 2/2012 | Sultan ................ H04L 12/4625 370/228 |
| 2012/0182861 | A1* | 7/2012 | Ma et al. ........................ 370/217 |
| 2012/0243406 | A1* | 9/2012 | Allan ...................... H04L 45/22 370/228 |
| 2012/0281525 | A1* | 11/2012 | Addanki et al. ............... 370/225 |
| 2012/0294140 | A1  | 11/2012 | Cheung et al. |

FOREIGN PATENT DOCUMENTS

| KR | 10-0328758 B1 | 3/2002 |
| KR | 10-2005-0066210 A | 6/2005 |
| KR | 10-2011-0084825 A | 7/2011 |
| KR | 10-2011-0088391 A | 8/2011 |

* cited by examiner

*Primary Examiner* — Anh Ngoc Nguyen
(74) *Attorney, Agent, or Firm* — Rabin & Berdo, P.C.

(57) ABSTRACT

An apparatus and method for protection switching are disclosed. The protection switching method in accordance with an example of the present disclosure is capable of smoothly processing a protection switching while preventing a data path mismatch occurring in the protection switching in a case in which a forced switching command (FS), which is a passive command, and a signal failure (SF) of a protection path occur at both end nodes, respectively, when a linear protection switching is performed by use of a protection state coordination message in a packet network or a packet transport network.

16 Claims, 6 Drawing Sheets

FIG. 4

| 1 | 2 | 3 | 4 | 5 | 6 | 7 | 7 | 7 | 8 | 9 |
|---|---|---|---|---|---|---|---|---|---|---|
| Clear (OC) | Lockout of Protection (LO) | Forced switch (FS) | SF on Protection (SF-P) | SF on Working (SF-W) | SD | Clear SF on Protection (SFc) | Clear SF on Working (SFc) | Clear SD | Manual switch (top) (MS) | WTR expires (WTRExp) |

(HIGH) ←——————————————————→ (LOW)

40, 42

METHOD AND APPARATUS FOR PROTECTION SWITCHING

CROSS-REFERENCE TO RELATED APPLICATION

This application claims the benefit under 35 U.S.C. §119 (a) of a Korean Patent Application No. 10-2012-0098904, filed on Sep. 6, 2012, the entire disclosure of which is incorporated herein by reference for all purposes.

BACKGROUND

1. Field

The following description relates to a technology for a packet network or a packet transport network, and more particularly, to a method and apparatus for protection switching in a packet network or a packet transport network.

2. Description of the Related Art

With increasing use of the Internet in recent years, the traffic of a communication network is increased at a remarkable speed, and users become to require various services, such as a high speed data service, an electronic commerce service, a remote medical service, a virtual education, and a real-time multimedia service.

Accordingly, there is a need for a management method of handling a network failure or performance degradation capable of providing users with seamless services based on stable operation of a communication network while maximizing network efficiency. As an example of the management method, a restoration and a protection switching are included. The restoration represents a method in which after occurrence of a network fault, an interrupted service is returned to an original service state by use of an available path and capacity for the network. The protection switching represents a method in which a path and bandwidth required between nodes are set in advance such that when a network failure occurs, a recovery is rapidly achieved.

A protection switching may be performed in a packet network or a packet transport network, and a linear protection switching in a corresponding network includes a method of performing a switching state management and a path protection switching by use of an automatic protection switching (APS) message, i.e., Linear Protection Switching in MPLS-TP, IETF draft draft-zulr-mpls-tp-linear-protection-switching-03.txt, ITU-T G.8131.1, and a method of performing a switching state management and a path protection switching by use of a protection state coordination (PSC) message, i.e., IETF RFC6378, ITU-T G.8131.2.

SUMMARY

The following description relates to a method and apparatus for protection switching capable of normally performing a switching state management and a path protection switching in a case in which a protection state coordination (PSC) message is used for a linear protection switching in a packet network or a packet transport network.

In one general aspect, a protection switching method of nodes includes: converting, by a node, a state of the node to a remote state according to a message received from a far-end node; upon detection of a local failure on a path of the node in the remote state, transmitting a path signal fail message together with data path information to the far-end node, and transmitting/receiving traffic through a corresponding data path; and upon reception of a no-request message from the far-end node in the remote state, converting to a normal state, and transmitting/receiving traffic through a corresponding data path.

The protection switching method may further include, if recognized that a message transmission is not normally performed due to a failure on a protection path serving as a message transmission path, matching a data path to a data path of the far-end node according to a message received when a current node state is a normal state or a conversion to the remote state is made.

Each of the nodes may be formed on a packet network or a packet transport network, and a message transmitted between the nodes may be a protection state coordination message, and each of the nodes may manage a switching state and perform a linear protection switching by use of the protection state coordination message.

In the converting to the remote state, if a local request command is not present or a new request command message having a higher priority than a previous remote request command or a previous local request command is received together with data path information from the far-end node, a current node state is converted to a remote state, a data path is matched with path information included in the received message, a message indicating a local command state of a current node is transmitted to the far-end node together with the data path information, and traffic is transmitted/received through the matched data path.

The remote state may represent one of a remote protecting administrative state, a unavailable state, and a protected failure state that enter since there is no valid local request besides a failure, according to reception of a request message including a lock out message, a forced switching message, a manual switching message, a path signal fail message, and a path signal degrade message from the far-end node.

The protection switching method may further include, if a path signal fail of a corresponding node is not present in the remote state, transmitting a no-request message to the far-end node together with data path information corresponding to the remote state, and transmitting/receiving traffic through a corresponding data path.

In another general aspect, a protection switching method of nodes includes: converting, by a node, from an initial normal state to a local protecting administrative state by a forced switching command, transmitting traffic through a protection path, and transmitting a remote forced switching message to a far-end node together with data path information; receiving, in the local protecting administrative state, a no-request message from the far-end node together with information indicating that a data path is a protection path; and receiving, in the local protecting administrative state, a protection path signal fail message from the far-end node together with information indicating that a data path is a protection path.

The protection switching method may further include: if a forced switching command is cleared in the local protecting administrative state, checking a message finally received from the far-end node, and if a declared local failure or a declared local command is not present and the message finally received is a no-request message, converting to a normal state, transmitting a no-request message to the far-end node together with information indicating that a data path is a working path, and transmitting/receiving traffic through the working path; and if the message finally received from the far-end node is a protection path signal fail message including information indicating that a data path is a protection path, recognizing a protection path signal fail, converting to a remote unavailable state, matching a data path to a data path of the far-end node as a protection path, transmitting a no-request message to the far-end node together with information indicating that a data path is a protection path, and transmitting/receiving traffic through the protection path.

In another general aspect, a protection switching method of nodes includes: converting, by a node, to a remote protecting administrative state upon reception of a remote forced switching message from a far-end node in an initial normal state and transmitting a no-request message to the far-end node together with information indicating that a data path is a protection path; and if a local failure of the protection path is detected in the remote protecting administrative state, transmitting a protection path signal fail message to the far-end node together with information indicating that a data path is a protection path.

The protection switching method may further include, if the local failure of the protection path is cleared, maintaining a node state in the remote protecting administrative state according to the remote forced switching message finally received from the far-end node; and upon reception of a no-request message from the far-end node, converting to a normal state.

In the transmitting of the protection path signal fail message to the far-end node, the node may transmit to the far-end node a protection path signal fail message including failure information according to a local failure of the protection path and protection path information according to the forced switching in a state that the local failure of the protection path is not ignored according to a priority rule. Herein, the priority rule assigns a higher priority to a local forced switching command than a local failure of a protection path.

In still another general aspect, a protection switching method of nodes includes: upon receiving a forced switching command in an initial normal state, by a node, converting to a local protecting administrative state, transmitting/receiving traffic through a protection path, and transmitting a remote forced switching message to a far-end node together with current data path information; recognizing a failure state based on a protection path signal fail message received from the far-end node where a protection path signal fail occurs in the local protecting administrative state, converting a node state to a remote unavailable state, matching a data path to a data path of the far-end node, and transmitting a no-request message to the far-end node; and converting to a normal state by receiving a no-request message from the far-end node.

In the transmitting of the no-request message to the far-end node, the node may recognize a protection path signal fail of the far-end node, in which the protection path signal fail occurs, by reception of a protection path signal fail message assigned a higher priority according to a priority rule in the local protecting administrative state, clear the forced switching command, convert to a remote unavailable state according to the protection path signal fail of the far-end node, and transmit a no-request message to the far-end node. Herein, the priority rule assigns a higher priority to a failure of a protection path than a forced switching command.

In the transmitting of the no-request message to the far-end node, upon reception of a protection path signal fail message from the far-end node in the local protecting administrative state, the node may recognize a protection path signal fail of the far-end node, in which the protection path signal fail occurs, according to a priority rule, convert to a remote unavailable state, match a data path to a data path of the far-end node, and transmit a no-request message to the far-end node. Herein, the priority rule assigns a higher priority to a failure of a protection path than a forced switching command.

In yet another general aspect, a protection switching method of nodes includes: converting, by a node, to a remote protecting administrative state upon reception of a remote forced switching message from a far-end node in an initial normal state and transmitting a no-request message to the far-end node; converting to a local unavailable state according to a priority rule upon detection of a local failure of a protection path in the remote protecting administrative state and transmitting a protection path signal fail message to the far-end node; and converting to a normal state if a remote request command or a local request having a high priority is not present, in a case when the local failure of the protection path is cleared after transmission of the protection path signal fail message and transmitting a no-request message to the far-end node. Herein, the priority rule assigns a higher priority to a failure of a protection path than a forced switching command.

Other features and aspects will be apparent from the following detailed description, the drawings, and the claims.

BRIEF DESCRIPTION OF THE DRAWINGS

FIG. 4 is a table showing a switching priority applied to a protection switching process of FIG. 3.

Figure 1:
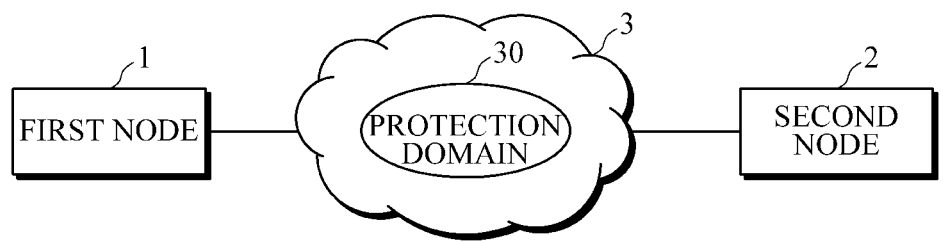
FIG. 1 is a block diagram illustrating a configuration of a multiprotocol label switching (MPLS) network including a protection domain in accordance with an example of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. In addition, terms described below are terms defined in consideration of functions in the present invention and may be changed according to the intention of a user or an operator or conventional practice. Therefore, the definitions must be based on content throughout this disclosure.

FIG. 1 is a block diagram illustrating a configuration of a multiprotocol label switching (MPLS) network including a protection domain in accordance with an example of the present disclosure.

The present disclosure relates to a protection switching technology in a packet network or a packet transport network. The following description will be made exemplifying that a packet transport network is referred to as a multi-protocol label switching (MPLS)—TP (Transport Protocol) network as an example, but the present disclosure is not limited to the MPLS-TP network and applicable to all packet networks or packet transport networks.

Referring to FIG. 1, a MPLS-TP network includes a label edge router (LER) that is located at a boundary with respect to an existing network and configured to generate a MPLS packet by affixing a label to an IP packet and to forward the MPLS packet to a MPLS network and also configured to end a MPLS connection to move from the MPLS network to another existing network, and a plurality of label switched routers (LSR) 3 configured to switch labels. In FIG. 1, a first node 1 and a second node 2 each correspond to a label edge router.

The present disclosure relates to a technology for managing a switching state and performing a linear protection switching by use of a protection state coordination (PSC) message in a packet network or a packet transport network. A protection domain 30 includes working paths consisting of two MPLS paths, representing uni-direction paths in opposite directions, and two pairs of protection paths, one pair of which consists of two MPLS paths, representing uni-direction paths in opposite directions. The PSC message is transmitted through the protection path. Respective nodes which are formed in a packet network or a packet transport network manage a switching state, and perform a linear protection switching, by use of a PSC message.

Figure 2:
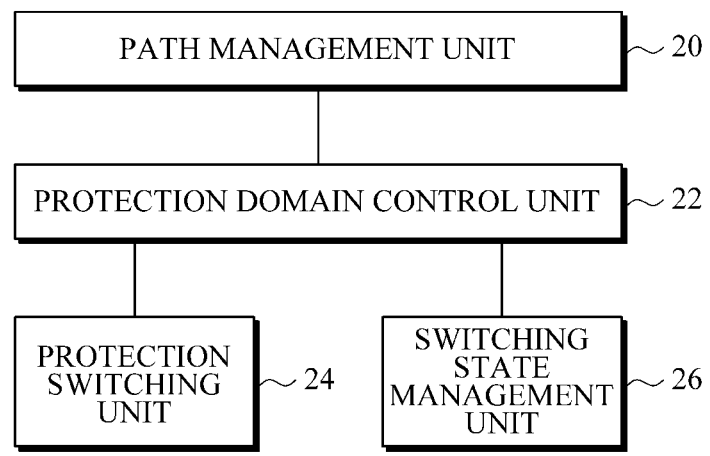
FIG. 2 is a block diagram illustrating a protection switching apparatus in accordance with an example of the present disclosure.

FIG. 2 is a block diagram illustrating a protection switching apparatus of nodes in accordance with an example of the present disclosure.

Referring to FIG. 2, the protection switching apparatus of nodes includes a path management unit 20, a protection domain control unit 22, a protection switching unit 24, and a switching state management unit 26.

The path management unit 20 sets working paths to transmit/receive packets therethrough as well as protection paths replaceable with the working paths, thereby generating a protection domain including the working paths and the protection paths.

The protection domain control unit 22 commands a protection switching execution by determining a signal failure of paths through path state information for each of the paths included in the protection domain, and checks the path state. In this case, the protection domain control unit 22 manages a switching state and performs a path protection switching by use of a PSC message. The switching state management and path protection switching process by the protection domain control unit 22 using the PSC message will be described later with reference to FIGS. 3 and 5 in detail.

The protection switching unit 24 performs a protection switching to transmit/receive packets through a normal path corresponding to a path having a signal failure according to a protection switching command. The switching state management unit 26 checks whether each of the paths included in the protection domain normally operates to manage a switching state of the paths accordingly.

Hereinafter, the switching state management and path protection switching process using the PSC message is described.

A node converts a node state to a remote state according to a message received from a far-end node. According to an example of the present disclosure, if a local request command is not present or a new request command message having a higher priority than a previous remote request command or a previous local request command is received together with data path information from the far-end node, a node converts a current node state to a remote state, matches a data path to path information included in the received message, transmits a message indicating a local command state of the current node to the far-end node together with data path information, and transmits/receives traffic through the matched data path. The remote state represents one of a remote protecting administrative state, a unavailable state, and a protected signal failure state that enter since there is no valid local request besides a signal failure, according to reception of a request message including a lock out message, a forced switching message, a manual switching message, a path signal failure message, and a path signal degrade message from the far-end node.

According to an example of the present disclosure, if a node detects a local signal fail indication on a path in the remote state, the node transmits a path signal failure message of a corresponding path together with data path information to the far-end node, and transmits/receives traffic through a corresponding data path. The path is a protection path or a working path. According to another example of the present disclosure, if a no-request message is received from the far-end node in the remote state, the node converts to a normal state, and transmits/receives traffic through a data path corresponding to the normal state.

Further, if it is recognized that a message transmission is not normally performed due to a signal failure of a protection path serving as a message transmission path, the node matches a data path to a data path of the far-end node according to a message received when a current node state is a normal state or a conversion to the remote state is made, thereby preventing a node-to-node mismatch in a traffic transmission/reception path in the remote state.

According to an example of the present disclosure, if a path signal failure of a corresponding node is not present in the remote state, the node transmits a no-request message to the far-end node together with data path information corresponding to the remote state, and transmits/receives traffic through a corresponding data path.

Hereinafter, the switching state management and path protection switching process using the PSC message will be described in detail through examples illustrated in FIGS. 3 and 5.

Figure 3:
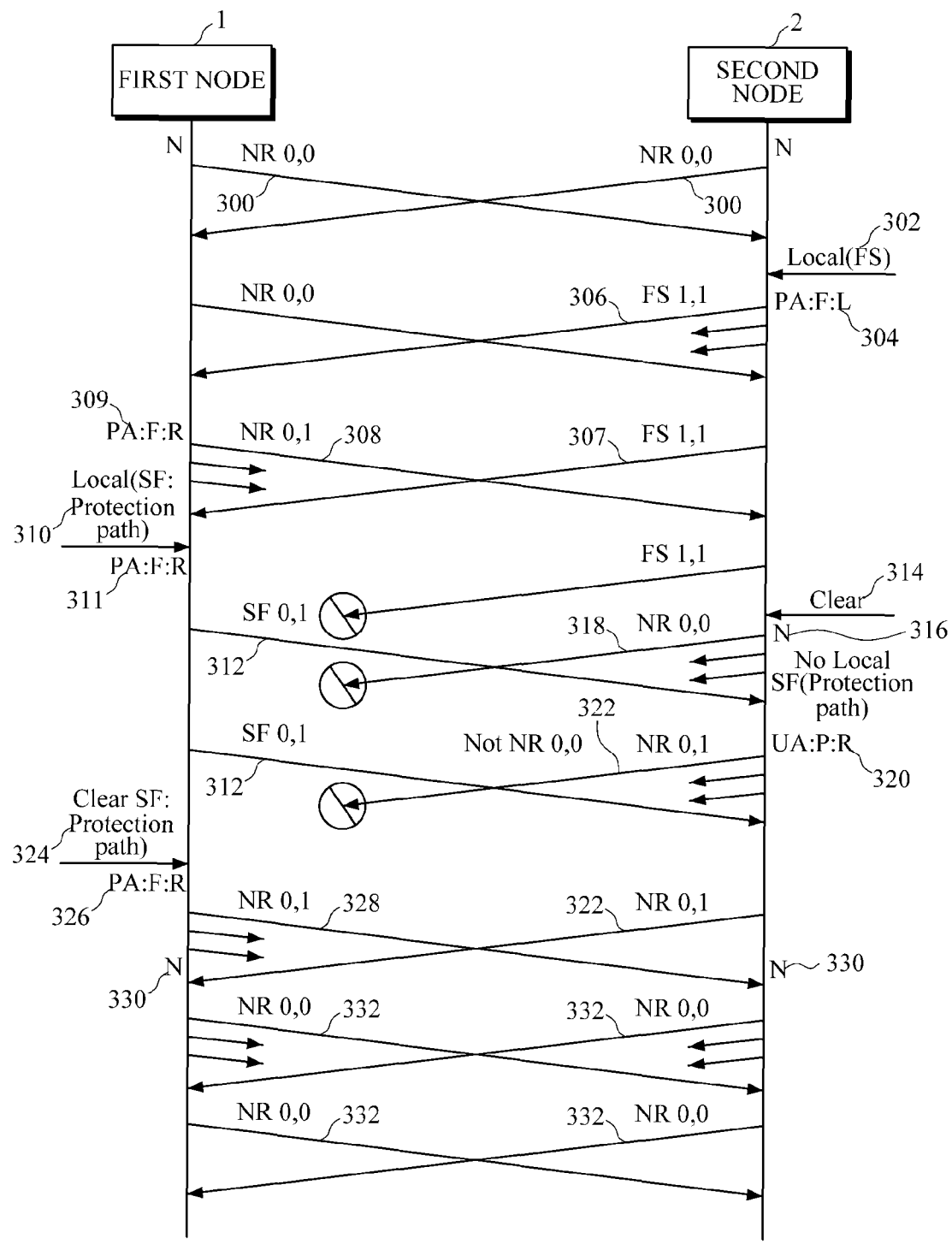
FIG. 3 is a flowchart illustrating a protection switching method in accordance with an example of the present disclosure.

FIG. 3 is a flowchart illustrating a protection switching method in accordance with an example of the present disclosure.

Referring to FIG. 3, if a local signal failure or a manual command, such as a forced switching command (FS) is not present, first and second nodes 1 and 2 of both end points of a protection domain transmit/receive NR messages (0,0) in normal states (N) (300), and in this case, traffic is transmitted through a working path. The NR message is a no-request message indicating that a switching request is not present.

Thereafter, if a forced switching command (FS) serving as a local manual command is applied to the second node 2 (302), an administrative state of the second node 2 is converted from the normal state (N) to a local protecting administrative state (PA:F:L) (304), and the second node 2 transmits FS (1,1), that is a remote forced switching message (remote FS), to the first node 1 (306), and traffic is delivered through a protection path.

The first node 1 having received the remote forced switching message of 306 converts from the normal state (N) to a remote protecting administrative state (PA:F:R) (309), the first node 1 transmits a NR (0, 1) message to the second node 2 (308), and traffic is delivered through a protection path.

When the first node 1 is in the remote protecting administrative state (PA:F:R) of 309 by reception of the remote FS message of 306, if a local signal fail indication on the protection path is detected (310), the local signal fail indication on the protection path is not ignored according to a priority rule, and the first node 1 transmits a SF(0,1) message to the second node 2 to transmit failure information on the protection path (SF (0, x)) and information on a path according to the priority of the first node 1 (a protection path xx(x,1) according to FS), and traffic is delivered through the protection path. According to the priority rule, as shown in FIG. 4, a local forced switching command (FS) has a higher priority than a local signal fail indication on the protection path (SF-P).

Due to the local signal fail indication on the protection path of 310, a message to be transmitted to the first node 1 fails to reach the first node 1, the first node 1 transmits a SF (0,1) message in a remote protecting administrative state (PA:F:R) (311) according to the remote forced switching message (remote FS) (307) that is finally received by the first node 1 to the second node 2 (312), and traffic is transmitted through a protection path.

In a case in which the second node 2 receives a Clear command (314) in the local protecting administrative state (PA:F:L) of 304, if a declared local signal failure or a declared local command is not present and a PSC message finally received from the first node 1 is a no-request message of 308, the second node 2 converts to a normal state (N) (316), and transmits a no-request message NR (0,0) to the first node 1 (318), and MPLS traffic is delivered through a working path.

The second node 2, upon receiving a SF (0,1) message from the first node 1 in the normal state N of 316, recognizes that the first node 1 has a protection path signal failure and is in an abnormal state, and thus the second node 2 converts to a remote unavailable state (UA:P:R) (320) according to the protection path signal failure, and transmits a NR (0,1) message to the first node 1 to match a data path to a data path of the first node 1 (322), and traffic is delivered through a protection path.

Meanwhile, in a case in which the second node 2 receives a Clear command of 314 in the local protecting administrative state (PA:F:L) of 304, if a declared local signal failure or a declared local command is not present and a PSC message finally received from the first node 1 is a SF (0, 1) message of 312, the second node 2 recognizes that the first node 1 has a protection path signal failure and is in an abnormal state, converts to a remote unavailable state (UA:P:R) of 320 according to the protection path signal failure, and transmits a NR (0,1) message to the first node 1 to match a data path to a data path of the first node 1 (322), and traffic is delivered through a protection path.

In general, if a local signal fail indication on the protection path (310) occurs at the first node 1 and is not cleared, the first node 1 transmits packets through a protection path, and the second node 2 is set to transmit packets through a working path, thereby failing to operating a protection switching in a proper manner and leading to mismatch in the traffic transmission/reception paths. However, according to the present disclosure, the second node 2 in the local protecting administrative state (PA:F:L) of 304 converts a node state according to a message finally received from the first node 1 where a protection path signal failure has occurred, transmits a no-request message NR (0,1) to the first node 1, and delivers traffic through a protection path, thereby matching a data path to a data path of the first node 1.

Thereafter, if the local signal fail indication on the protection path of the first node 1 is cleared (clear SF: protection) (324), even if a declared local failure or a declared local command is not present, the first node 1 transmits a NR (0,1) message to the second node 2 in a remote protecting administrative state (PA:F:R) (326) based on the remote forced switching message (remote FS) (307) that is a PSC message finally received (328), and traffic is delivered through a protection path.

When the first node 1 and the second node 2 transmit/receive the NR (0,1) messages between each other in 322 and 328, the both nodes 1 and 2, if a declared local signal failure or a declared local command is not present, convert to normal states (N) (330), and transmit/receive NR (0,0) messages between each other (332), and MPLS traffic is delivered through a working path.

FIG. 4 is a table showing a switching priority applied to a protection switching process of FIG. 3.

Referring to FIG. 4, the switching priority assigns a higher priority to a local forced switching command (FS) (40) than a local signal fail indication (42) on a protection path (SF-P).

Figure 5:
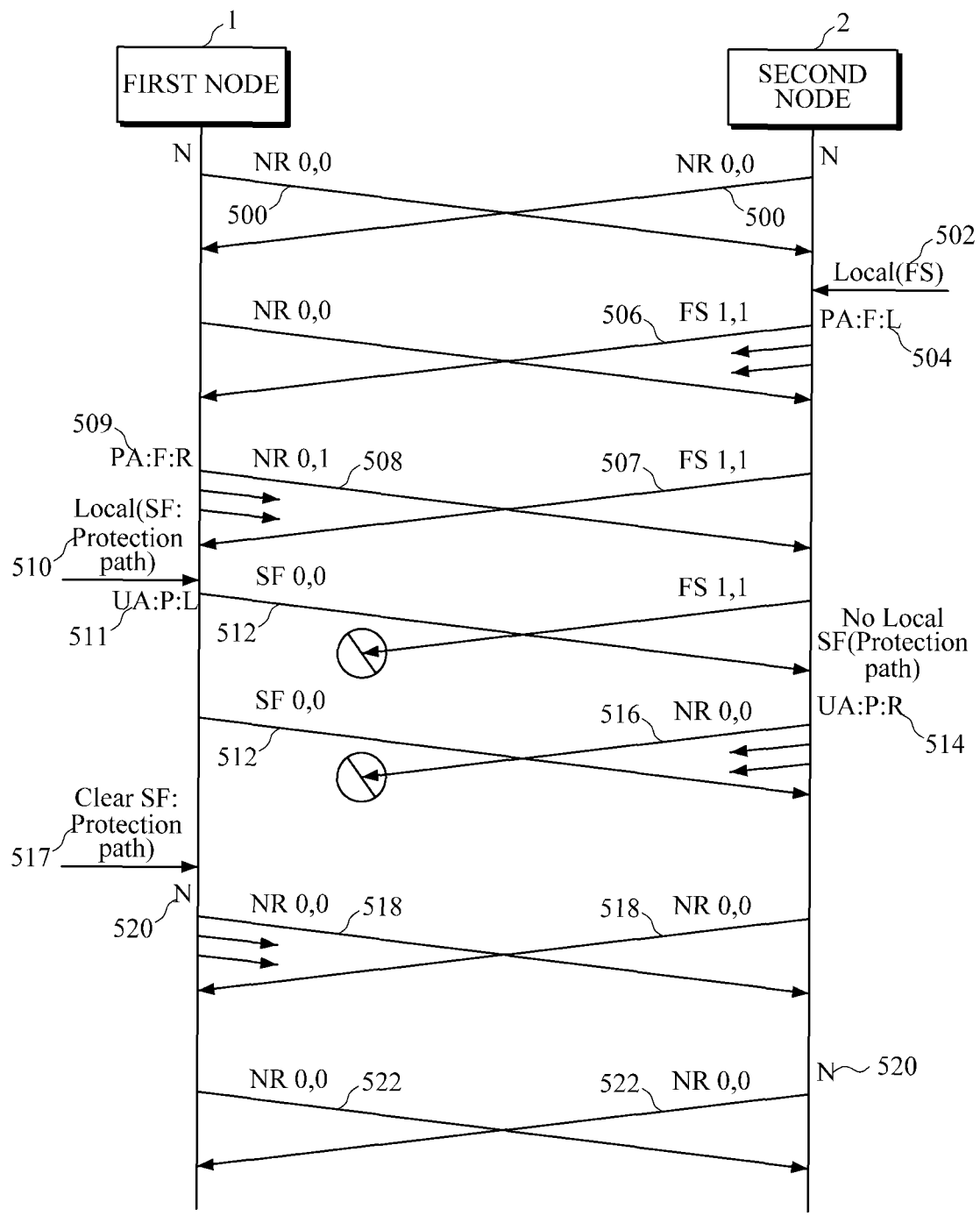
FIG. 5 is a flowchart illustrating a protection switching method in accordance with another example of the present disclosure.

FIG. 5 is a flowchart illustrating a protection switching method in accordance with another example of the present disclosure.

Referring to FIG. 5, if a manual command such as a local signal failure or a forced switching command (FS) is not present, the first node 1 and the second node 2 at both end points of the protection domain transmit/receive NR (0,0) messages between each other in a normal state N (500), and traffic is delivered through a working path.

Thereafter, if a forced switching (FS) command serving as a local manual command is applied to the second node 2 (502), an administrative state of the second node 2 is converted from the normal state (N) to a local protecting administrative state (PA:F:L) (504), the second node 2 transmits FS (1,1), that is, a remote forced switching message (remote FS) to the first node 1 (506), and traffic is delivered through a protection path.

The first node 1 having received the remote forced switching message of 506 converts from the normal state (N) to a remote protecting administrative state (PA:F:R) (509), and the first node 1 transmits a NR (0,1) message to the second node 2 (508), and traffic is delivered through a protection path.

Figure 6:
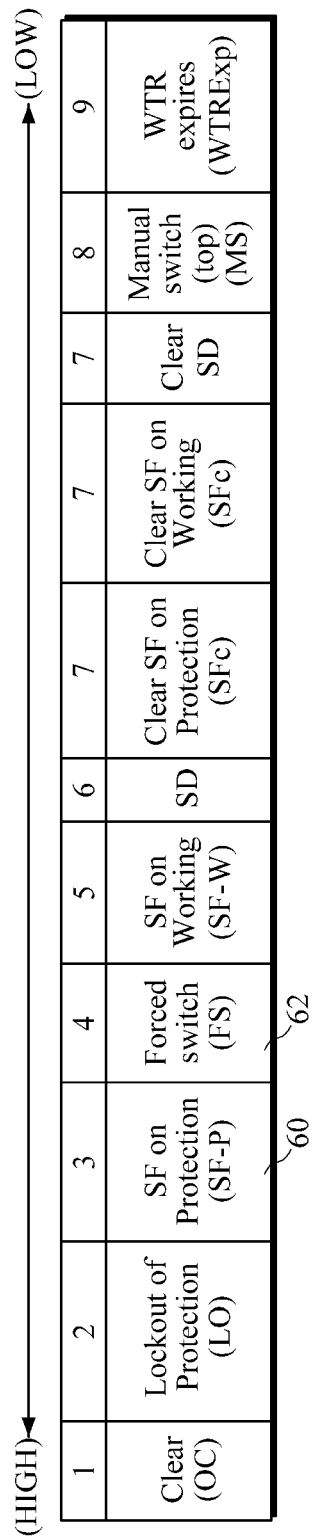
FIG. 6 is a table showing a switching priority applied to a protection switching process of FIG. 5.

When the first node 1 is in the remote protecting administrative state (PA:F:R) of 509 by reception of the remote forced switching message (remote FS) of 506, if a local signal fail indication on the protection path is detected (510), the first node 1 converts to a local unavailable state (UA:P:L) (511) due to the protection path signal failure according to the priority rule, and the first node 1 transmits a SF (0,0) message to the second node 2, and traffic is delivered through a working path. According to the priority rule, as shown in FIG. 6, the local signal fail indication on the protection path (SF-P) is assigned a higher priority than the local forced switching command (FS).

In a case in which the second node 2 receives a Clear command in the local protecting administrative state (PA:F:L) of 504, if a declared local signal failure or a declared local command is not present and a PSC message finally received from the first node 1 is a NR message, the second node 2 converts to a normal state N and transmits a NR (0,0) message to the first node 1, and traffic is delivered through a working path.

The second node 2, upon receiving a SF (0,0) message from the first node 1 in the normal state N, recognizes that the first node 1 has a protection path signal failure and is in an abnormal state, and thus the second node 2 converts a current node state to a remote unavailable state (UA:P:R) (514) due to the protection path signal failure, and transmits a NR (0,0) message to the first node 1 to match a data path to a data path of the first node 1 (516), and traffic is delivered through a working path.

Meanwhile, the second node 2, upon receiving a SF (0,0) message (512) belonging to a PSC message in the local protecting administrative state (PA:F:L) (504), recognizes that the first node 1 has a protection path signal failure and is in an abnormal state, and thus the second node 2 clears the local forced switching command, converts the current node state to a remote unavailable state (UA:P:R) of 514 due to the protection path signal failure, and transmits a NR (0,0) message to the first node 1 (516), and traffic is delivered through a working path. The priority rule, as shown in FIG. 6, assigns a higher priority to the local signal fail indication on the protection path (SF-P) than the local forced switching command (FS).

Thereafter, if the local signal fail indication on the protection path of the first node 1 is cleared (517) and a declared local signal failure or a declared local command is not present, the first node 1 converts to the normal state N (520) and transmits a NR (0,0) message to the second node 2 (518), and traffic is delivered through a working path.

When the first node 1 and the second node 2 receive the NR messages (518), the both nodes 1 and 2, if a declared local signal failure or a declared local command is not present, convert to normal states N (520), and transmit/receive NR (0,0) messages between each other (522), and traffic is delivered through a working path.

FIG. 6 is a table showing a switching priority applied to a protection switching process of FIG. 5.

Referring to FIG. 6, the switching priority assigns a higher priority to a local signal fail indication on a protection path (SF-P) (60) than a local forced switching command (FS) (62).

As is apparent from the above, drawbacks associated with a linear protection switching performed by use of a protection state coordination (PSC) message in a packet network or a packet transport network are solved, thereby normally managing a switching state and performing a protection switching. That is, even when a forced switching command (FS), which is a passive command, and a signal failure (SF) of a protection path occur at both end nodes, respectively, a protection switching is smoothly processed, and a data path mismatch occurring in the protection switching is prevented, so that traffic is normally protected.

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A linear protection switching method of nodes in a MPLS (Multi Protocol Label Switching)-TP (Transport Protocol) network, comprising:
   converting a state of a node to a remote state in response to a message received from a far-end node;
   upon detection of a new local request by the node in the remote state, transmitting a protection state coordination (PSC) message containing request information, traffic data path information and fault path information and indicating a local fault condition and a request state to the far-end node according to a priority of the new local request, and transmitting/receiving traffic through a protection or working data path;
   upon detection of a local request having a highest priority, converting a state of the node to a local state; and
   upon detection of a new remote request by the node in the local state, transmitting a PSC message containing request information, traffic data path information and fault path information and indicating a local fault condition and a request state to the far-end node according to the priority of the new remote request, and transmitting/receiving traffic through a data path matched with the data path of the far-end node according to the traffic data path information.

2. The protection switching method of claim 1, further comprising, if recognized that a message transmission is not normally performed due to a failure on a protection path serving as a message transmission path, matching a data path to a data path of the far-end node according to a message received when a current node state is a normal state or a conversion to the remote state is made.

3. The protection switching method of claim 1, wherein each of the nodes is formed on a packet network or a packet transport network, and the message transmitted between the nodes is the protection state coordination message, and each of the nodes manages a switching state and performs a linear protection switching by use of the protection state coordination message.

4. The protection switching method of claim 1, wherein in the converting to the remote state,
   if a local request command is not present or a new request command message having a higher priority than a previous remote request command or a previous local request command is received together with data path information from the far-end node, a current node state is converted to a remote state,
   wherein in the transmitting the path signal fail message, a data path is matched with path information included in the received message, a message indicating a local command state of a current node is transmitted to the far-end node together with the data path information, and traffic is transmitted/received through the matched data path.

5. The protection switching method of claim 1, wherein the remote state represents one of a remote switching administrative state, an unavailable state, and a protecting failure state that enter since there is no valid local request besides a failure, according to reception of a request message including a lockout message, a forced switch message, a manual switch message, a path signal fail message, and a path signal degrade message from the far-end node.

6. The protection switching method of claim 1, further comprising, if a path signal fail of the node is not present in the remote state, transmitting a no-request message to the far-end node together with data path information corresponding to the remote state, and transmitting/receiving traffic through the protection or working data path.

7. A linear protection switching method of nodes in a MPLS (Multi Protocol Label Switching)-TP (Transport Protocol) network, comprising:
 converting from a normal state to a local switching administrative state by a forced switch command, transmitting traffic through a protection path, and transmitting a remote forced switch protection state coordination (PSC) message to a far-end node together with data path information;
 receiving, in the local switching administrative state, a no-request message indicating that there is no request information from the far-end node together with information indicating that a data path is a protection path; and
 receiving, in the local switching administrative state, a protection path signal fail message containing signal fail request information and fault path information from the far-end node together with information indicating that a data path is a protection path,
 wherein the PSC message transmitted between the nodes contains request information, fault path information, and traffic data path information.

8. The protection switching method of claim 7, further comprising, if the forced switch command is cleared in the local switching administrative state, checking a message finally received from the far-end node, and if a declared local failure or a declared local command is not present and the message finally received is a no-request message, converting to a normal state, transmitting a no-request message to the far-end node together with information indicating that a data path is a working path, and transmitting/receiving traffic through the working path.

9. The protection switching method of claim 7, further comprising, if the message received from the far-end node is a protection path signal fail message including information indicating that a data path is a protection path, fault path information, and information indicating that a fault path is a protection path, recognizing a protection path failure, converting to a remote unavailable state, matching a data path to a data path of the far-end node as a protection path, transmitting, if there is no local request, a no-request message to the far-end node together with information indicating that a data path is a protection path, and transmitting/receiving traffic through the protection path.

10. A linear protection switching method of nodes in a MPLS (Multi Protocol Label Switching)-TP (Transport Protocol) network, comprising:
 upon receiving a forced switch command in a normal state, converting to a local switching administrative state, transmitting/receiving traffic through a protection path, and transmitting a remote forced switch protection state coordination (PSC) message to a far-end node together with current data path information; and
 recognizing a failure state based on a protection path signal fail message received from the far-end node where a protection path signal fail occurs in the local switching administrative state, converting a node state to a remote unavailable state, matching a data path to a data path of the far-end node, and transmitting a no-request message to the far-end node,
 wherein the PSC message transmitted between the nodes contains request information, fault path information, and traffic data path information.

11. The protection switching method of claim 10, wherein in the transmitting of the no-request message to the far-end node,
 recognizing the protection path signal fail of the far-end node, in which the protection path signal fail occurs, by reception of the protection path signal fail message assigned a higher priority for switching according to a priority rule in the local switching administrative state, clearing the forced switch command, converting to a remote unavailable state according to the protection path signal fail of the far-end node, and transmitting a no-request message to the far-end node.

12. The protection switching method of claim 11, wherein the priority rule assigns a higher priority to a failure of a protection path than a forced switch.

13. The protection switching method of claim 10, wherein in the transmitting of the no-request message to the far-end node,
 upon receiving the protection path signal fail message from the far-end node in the local switching administrative state, recognizing the protection path signal fail of the far-end node, in which the protection path signal fail occurs, according to the priority rule for switching, converting to a remote unavailable state, matching a data path to a data path of the far-end node, and transmitting a no-request message to the far-end node.

14. The protection switching method of claim 13, wherein the priority rule for switching assigns a higher priority to a failure of a protection path than a forced switch command.

15. The protection switching method of claim 1, further comprising, if a new request has a higher priority than a previous local request, clearing the previous local request.

16. A linear protection switching method of nodes in a MPLS (Multi Protocol Label Switching)-TP (Transport Protocol) network, comprising:
 performing linear protection switch in the MPLS-TP network according to a protection state coordination (PSC) message that contains request information, fault path information, and traffic data path information;
 for linear protection switching, assigning a higher priority to signal fail on protection transport entity (SF-P) than forced switch (FS); and
 performing linear protection switch according to the assigned priority when SF-P and FS occur, respectively, on both end nodes.

* * * * *